Patented Jan. 2, 1940

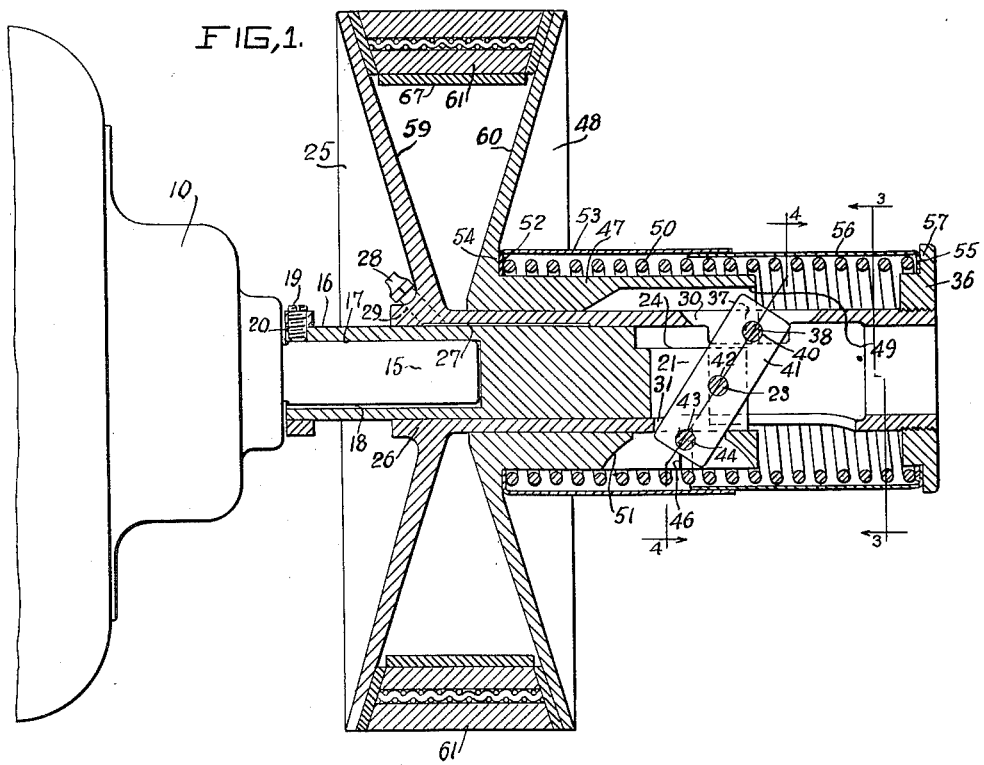
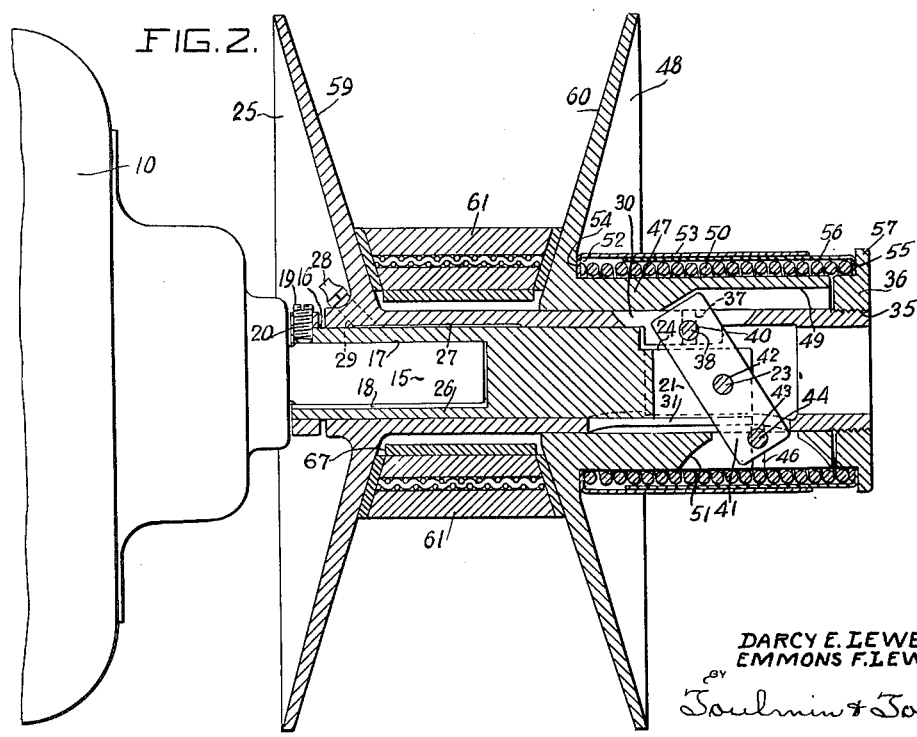

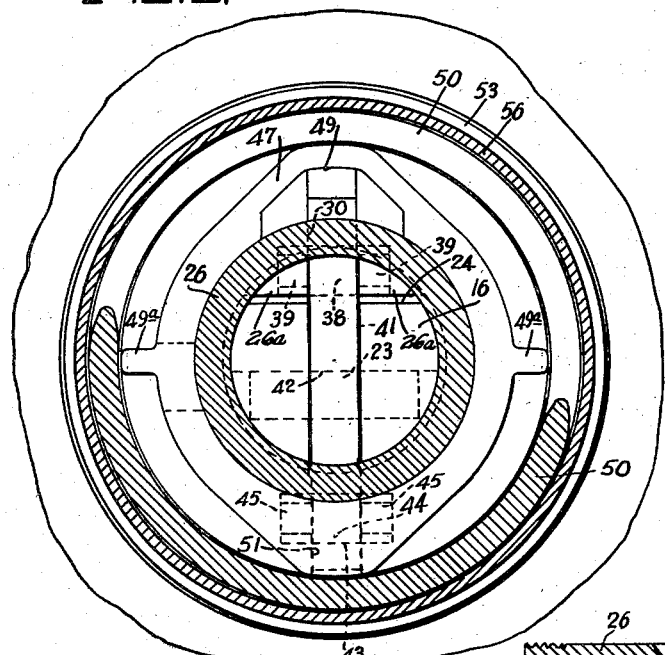
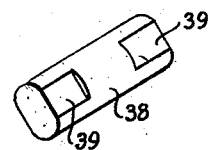
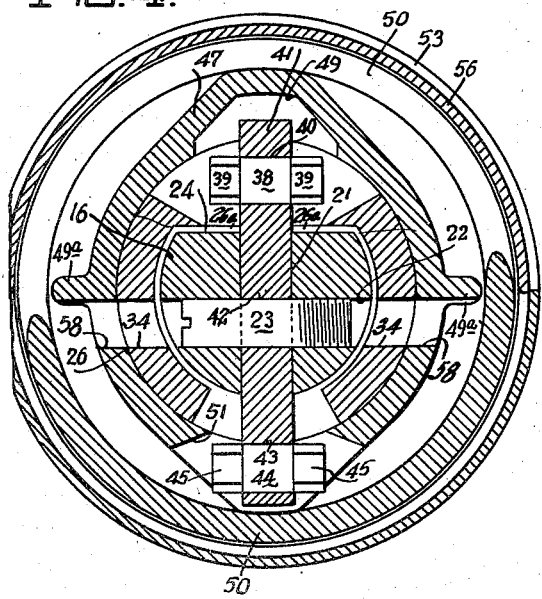
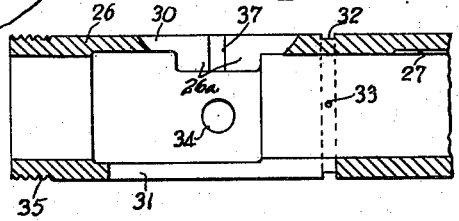
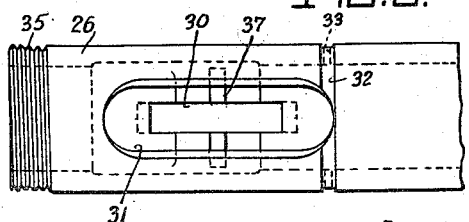

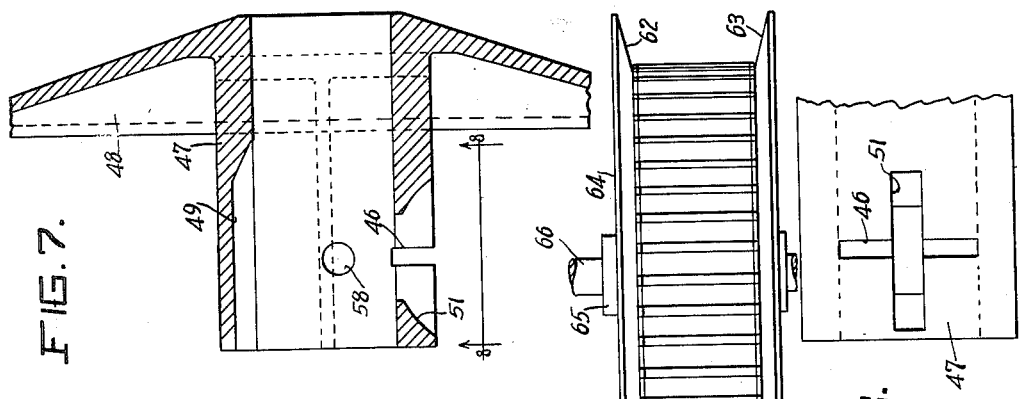
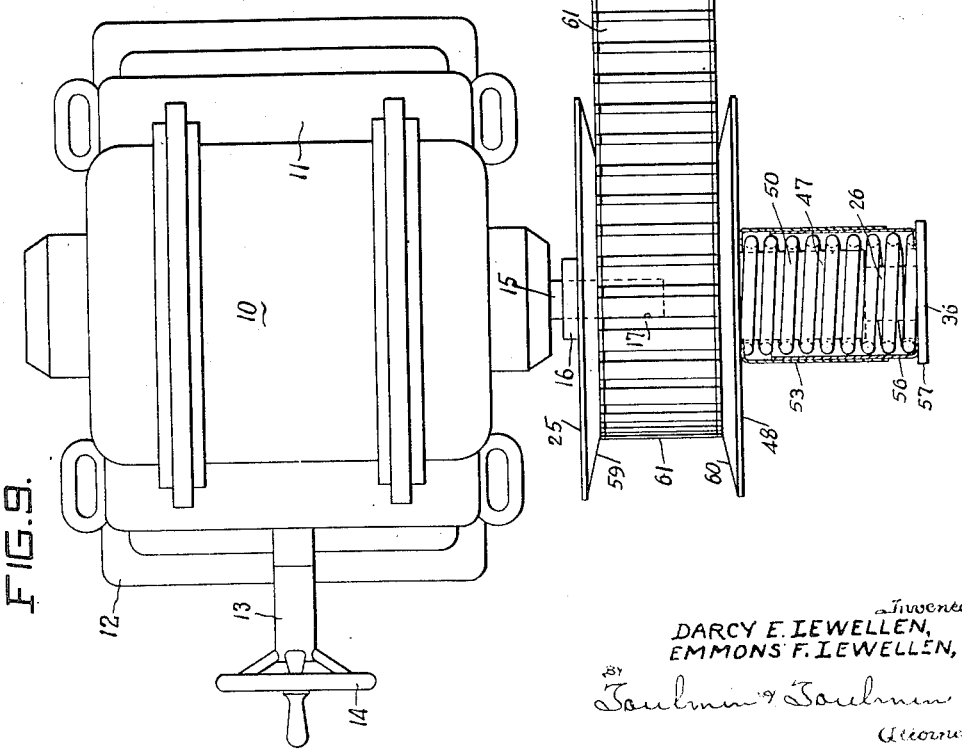

2,185,411

UNITED STATES PATENT OFFICE 2,185,411

SPEED VARYING MECHANISM

Darcy E. Lewellen and Emmons F. Lewellen, Columbus, Ind.

Application March 15, 1937, Serial No. 130,843

5 Claims. (Cl. 74—230.17)

This invention relates to speed varying mechanisms, and in particular, to such mechanisms which employ cone pulleys with separable halves.

One object of this invention is to provide a speed varying mechanism wherein the separate cones of a variable speed pulley are positively driven and positively positioned by means acting also to convey power to the pulley from the drive shaft.

Another object is to provide such a speed varying mechanism, wherein the positive driving means consists of a link operatively connected to both pulley halves and adapted to maintain a constant driving connection therewith, regardless of the position of the pulley halves.

Another object is to provide a variable speed mechanism, wherein a fixed pulley and a separable cone pulley are mounted on substantially parallel shafts, and interconnected by a belt, mechanism being provided for varying the distance between the shafts, the separable cone pulley having means therein for positively driving both pulley halves regardless of their relative positions.

Another object is to provide a variable speed mechanism having resilient means for urging the pulley halves in opposite directions, and telescoping means for forming a closure and retaining the lubricant within the device.

In the drawings:

Figure 1 is a central vertical section through the variable speed pulley of this invention, showing the pulley halves in their closed or maximum diameter positions.

Figure 2 is a view similar to Figure 1, but showing the pulley halves in their open or minimum diameter positions.

Figure 3 is a vertical cross section along the line 3—3 in Figure 1.

Figure 4 is a vertical cross section along the irregular line 4—4 in Figure 1.

Figure 5 is a vertical longitudinal section of the hub of the left-hand pulley cone in Figure 1, looking in the opposite direction.

Figure 6 is a bottom plan view of the pulley hub shown in Figure 5.

Figure 7 is a central vertical section through the right-hand pulley hub of Figure 1, looking in the opposite direction.

Figure 8 is a bottom plan view of the hub of the pulley half shown in Figure 7.

Figure 9 is a top plan view of a speed varying mechanism according to this invention.

Figure 10 is a perspective view of one of the driving pins for the variable speed pulley halves.

In general, the speed varying mechanism or device of this invention consists of a pair of substantially parallel shafts with a pair of separable cones mounted on one shaft and movable axially therealong. These separable cones are positively driven by a link connected to the motor drive shaft in such a manner as to provide a positive driving and positioning arrangement, regardless of the relative positions of the pulley halves. Another feature of the invention is the provision of a telescoping casing surrounding the spring which urges the pulley halves in opposite directions.

Referring to the drawings in detail, Figure 9 shows a motor 10 mounted on a carriage 11, which is movable relatively to a base 12 by means of a screw shaft 13 operated by a hand wheel 14. The motor 10 is provided with a motor shaft 15 having a driving shaft 16 secured thereto, as by the socket 17, into which the motor shaft 15 is extended. A key 18 provides a driving connection between the motor shaft 15 and the drive shaft 16, and a set screw 19 in a threaded hole 20 provides means for locking the assembly of the motor shaft 15 and drive shaft 16 together. The drive shaft 16 is provided at its right-hand or opposite end with a slot 21 (Figures 1 and 4), and a transverse threaded hole 22 containing a threaded pivot pin 23. The drive shaft 16 is also provided with a flattened portion 24 along the top right-hand end, as shown in Figures 1 and 4.

Mounted upon the drive shaft 16 is a conical pulley half 25 having a hub 26 extending longitudinally along the shaft 16. An oil space 27 is provided therebetween and equipped with a lubricating connection 28 for providing lubricant to the space 27 through the bore 29. The hub 26 is in the form of a sleeve, having cutaway portions 30 and 31 at the top and bottom, respectively (Figures 1, 5 and 6) and also is provided with an oil groove 32 communicating with the shaft 16 by means of the oil hole 33 (Figure 5). A hole 34 provides access to the pivot pin 23, and a threaded portion 35 serves for receiving a nut 36 for the purpose of retaining the various parts mounted upon the hub 26.

The hub 26 of the pulley half 25 is provided in its upper portion with an internally extending shoulder 26a having a transverse slot 37 therethrough (Figures 1 and 5) and this slot serves to receive a transverse driving pin 38 having flattened ends 39 (Figure 10). The flattened ends 39 engage the side walls of the slot 37, whereas the central portion passes through a bore 40 in a link 41 having a transverse hole 42 for receiving the pivot pin 23 and forming a pivotal mounting thereof. The opposite end of the link 41 is provided with a transverse hole 43, receiving the midportion of a driving pin 44 having flattened ends 45, similar to the flattened ends 39 of the driving pin 38. These flattened ends 45 engage the side walls near the opposite ends of a transverse slot 46 (Figures 1 and 7) in the sleeve-like hub 47 of a second conical pulley half 48 mounted upon and slidable along the hub 26 of the first pulley half 25. The hub 47 is provided near its outer end with a cutaway portion 49 forming a chamber, permitting the motion of the upper end of the link 41 to and fro from the closed position of Figure 1 to the open position of Figure 2. The hub 47 is likewise provided with longitudinal ribs 49a, these ribs giving a strengthening effect to the hub. The lower end of the link 41 similarly moves through the cutway portion 51 in the hub 47.

The hub 47 of the cone pulley half 48 is surrounded by a spiral compression spring 50 (Figure 1), the inner end of which engages the flanged portion 52 of an outer telescoping member 53, which in turn, engages the annular wall 54 of the cone pulley half 48. The opposite end of the coil spring 50 similarly engages the flanged portion 55 of the inner telescoping member 56, the latter in turn, engaging the flange 57 upon the nut 36. Consequently, the telescoping portions 53 and 56 form a protecting casing over the spring 50 and the slidable hubs 47 and 26, thereby reducing the escape of lubricant and preventing the entrance of dust or other foreign matter which might interfere with the smooth working of the various parts. A hole 58 in the hub 47 corresponds to the hole 34 in the hub 26.

The pulley halves 25 and 48 are engaged upon their conical inner surfaces 59 and 60 by a V-belt 61, of any suitable form. This may consist, for example, of a rubber and fabric V-belt or else a belt formed of interconnected slats. The edges of the belt 61 also engage the inner conical walls 62 and 63 of a fixed diameter cone pulley 64 (Figure 9), this having a hub 65 mounted upon a shaft 66. Alternatively the inner surface of the belt 61 may engage the surface of a flat-faced fixed pulley (not shown). In the latter case, friction pads 67 may be added to the inner surface of the interconnected slat belt to provide a friction driving surface.

In the operation of the variable speed mechanism or transmission of this invention, the axes of the shafts 16 and 66 (Figure 9) are varied by turning the hand wheel 14 and the screw shaft 13, thereby causing the carriage 11 and motor 10 to move relatively to the base 12. If the distance between the shafts 66 and 16 is increased, the belt 61 forces the pulley halves 48 and 25 apart, thereby approaching the positions of Figure 2 at the extreme limit of motion. This occurs because the belt 61 has a constant length. When the pulley halves 25 and 48 are thus separated, the spring 50 is compressed and the tubular members 53 and 56 telescope relatively to each other (Figure 1). The edges of the belt 61, therefore, engage the halves 25 and 48 upon a reduced diameter, and therefore impart a slower speed to the shaft 66 because the pulley 64 maintains a constant diameter.

If, however, the hand wheel 14 and screw shaft 13 are moved in the opposite direction, so that the carriage 11 and shaft 16 move toward the shaft 66, the force of the spring 50 urges the pulley halves 25 and 48 toward one another as the belt 66 slackens. The pulley halves 25 and 48 eventually reach their extreme or closed positions, shown in Figure 1. Meanwhile, the rotation of the motor shaft 15 transmits power to the drive shaft 16, which in turn, positively transmits power through the link 41 to the inner and outer pulley hubs 26 and 47 by way of the slots 30 and 51 therein.

It will be seen from a comparison of Figures 1 and 2, that the pivoted link 41, with its pins 38 and 44, maintains a positive driving and positioning engagement with the pulley hubs 47 and 26 during their entire motion between the extreme positions of Figures 1 and 2. In this manner the pulley halves are enabled to maintain a fixed center line so that the fixed pulley 64 does not have to be of greater width than the belt nor to be moved axially along its shaft 66 as the speed varying transmission is adjusted to a different speed, because the belt remains in a fixed central position and does not travel sidewise. At the same time the link 41 and its associated pins form an element which serves as a positive driving and positioning means between the pulley halves 25 and 48 and the drive shaft 16. The telescoping tubular members 53 and 56 form a constant and tight closure over the spring 50 and the other parts of the variable speed pulley shown in Figures 1 and 2.

It will be understood that we desire to comprehend within our invention such modifications as come within the scope of the claims and the invention.

Having thus fully described our invention, what we claim as new and desire to secure by Letters Patent, is:

1. In a variable speed device, a shaft, a pair of cone-faced discs mounted on said shaft, at least one of said discs being movable axially thereon, a driving element pivotally mounted on said shaft on a pivot axis passing through the vicinity of the axis of rotation of said shaft, one of said discs having a hub slidably mounted relatively to said shaft, said hub having a slotted portion, and means near the end of said driving element for drivingly engaging said slotted portion.

2. In a variable speed device, a shaft, a pair of cone-faced discs mounted on said shaft, both of said discs being movable axially therealong, said discs having telescoping hubs mounted for motion along said shaft, said hubs having portions with transverse slots therein, a driving element pivotally connected to said shaft on a pivot axis passing through the vicinity of the axis of rotation of said shaft, and contact elements mounted on the opposite ends of said driving element in engagement with the slots in said hubs for drivingly engaging and positioning said hubs relatively to said driving element.

3. In a variable speed device, a shaft, a pair of cone-faced discs mounted on said shaft, both of said discs being movable axially therealong, means for varying the diameter of engagement of said belt with said discs, said discs having telescoping hubs mounted for motion along said shaft, said hubs having cutaway portions, a driving element pivotally connected to said shaft on a pivot axis passing through the vicinity of the axis of rotation of said shaft, and means operatively interconnecting the opposite ends of said driving element and said hubs and entering said cutaway portions of said hubs for drivingly engaging and positioning said hubs relatively to said driving element.

4. In a variable speed device, a shaft, a pair of pulley halves movably mounted on said shaft, a driving element connected to said shaft, said pulley halves having telescoping hubs, connecting devices on said driving element for drivingly engaging said hubs, a tubular casing connected to one of said pulley halves, a second tubular casing in telescoping relationship therewith connected to the hub of the other pulley half, and an elongated coil spring encircling said shaft within said telescoping tubular casings and constructed and arranged to urge said pulley halves toward each other.

5. In a variable speed device, the combination of an expansible pulley formed by two pulley halves having telescoping hubs and movable axially relatively to form a belt pulley of varying diameter, a driving element for said pulley, connecting devices between said driving element and pulley, a tubular casing connected to one of said pulley halves, a second tubular casing in telescoping relationship therewith connected to the hub of the other pulley half, and an elongated coil spring encircling said hub within said telescoping tubular casings and constructed and arranged to urge said pulley halves toward each other.

DARCY E. LEWELLEN.
EMMONS F. LEWELLEN.